United States Patent [19]

Bockemühl-Simon et al.

[11] 4,248,530
[45] Feb. 3, 1981

[54] FRAME FOR MAKING PHOTOCOPIES

[75] Inventors: Jürgen Bockemühl-Simon; Rainer Bernhardt, both of Bergneustadt, Fed. Rep. of Germany

[73] Assignee: Johannes Bockemuehl, Gummersbach, Fed. Rep. of Germany

[21] Appl. No.: 52,978

[22] Filed: Jun. 28, 1979

[30] Foreign Application Priority Data

Jul. 1, 1978 [DE] Fed. Rep. of Germany ....... 2829020

[51] Int. Cl.³ .............................................. G03B 27/58
[52] U.S. Cl. .......................................... 355/74; 355/54
[58] Field of Search ............................. 355/74, 54, 72

[56] References Cited

U.S. PATENT DOCUMENTS

| | | | |
|---|---|---|---|
| 3,280,694 | 10/1966 | Buechner | 355/54 |
| 3,944,364 | 3/1976 | Petrini et al. | 355/74 |
| 4,154,526 | 5/1979 | Kostiner | 355/74 |

*Primary Examiner*—Richard A. Wintercorn
*Attorney, Agent, or Firm*—Michael J. Striker

[57] ABSTRACT

A frame for making photocopies, includes a support plate having an upper surface adapted to support photosensitive sheet material and including four edges. At least two covers are provided, for covering respective sections of the upper surface of the plate so as to prevent light penetration onto the latter. Each of the covers is pivotable independently of the other between a first position in which a respective section of the upper surface of the plate is uncovered and a second position in which the respective section of the upper surface is covered. When the covers are in the abovementioned second position, they light sealingly engage the respective edges of the plate.

13 Claims, 3 Drawing Figures

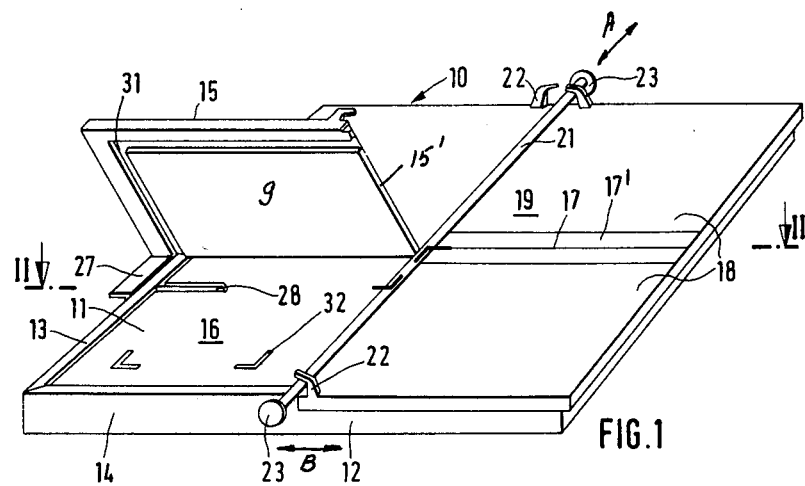
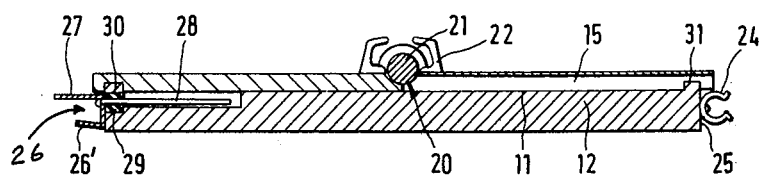
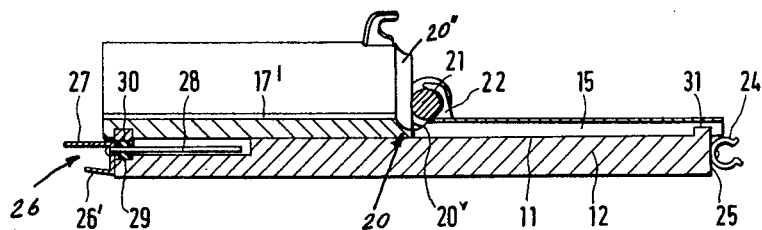

FRAME FOR MAKING PHOTOCOPIES

BACKGROUND OF THE INVENTION

The present invention relates to frames for making photocopies.

More particularly, the present invention is concerned with frames for making photocopies from negatives, diapositives, etc. onto a photosensitive sheet material.

It is known in the prior art to provide a frame for making photocopies, including a support plate having a circumferential edge portion defining an upper surface which is adapted to support photosensitive sheet material. The upper surface of the frame may be subdivided into four equally large sections. Four covers are provided, for covering respective sections of the upper surface of the plate. Each cover is adapted to pivot independently of the others between a first position in which a respective section of the upper surface of the plate is uncovered and a second position in which the above-mentioned respective section of the upper surface of the plate is covered.

Thus, depending from the size of the photosensitive sheet material, different section of the upper surface of the plate may be exposed at once or one after another, for example, two halfes of the upper surface may be eposed at once or one after another, four quarters of the upper surface of the plate may be exposed at once or one after another. Correspondingly, the covers may be moved between the above-mentioned first and second positions at once as one unit or one after another. In order to avoid double illumination (i.e. exposure) which might occur due to mistake on the part of an operator, the covers overlap one another along their respective flanges, and therefore, the covers may be pivoted from the first into second position only in a certain succession which has to be reversely preserved when the covers move from the second into the first position. A given lightproof resistance of such a frame practically precludes any penetration of light onto the upper surface of the plate. However, sometimes such a light penetration is desirable, for example, when it is necessary to arrange a new negative, to adjust the focus, to read light filter—or exposure data.

Moreover, the overlapped flanges of the covers lead to development of white portions on the photocopies, corresponding to the unexposed portions of the photo sensitive sheet material during exposure of the latter. Later, these white portions have to be cut off from the made photocopies which obviously leads to undesirable waste of comparatively expensive material of the photocopies.

The above described frame may be used only for making photocopies of a photosensitive sheet material which has overall dimensions corresponding to those of the frame. Thus, different types of the photosensitive sheet material which is presently available on the market can not be used on such a frame without being correspondingly cut prior to installment onto the support plate. This consideration is for example fully applicable to the photosensitive sheet material having overall dimensions 18×24 em (i.e. 8×10″)

In German utility model DGBM 7629374 it has been suggested, for eample, to use a frame having a support plate without circumferential flanges. Such a plate makes it possible to install on the upper surface thereof a photosensitive sheet material of different large sizes. In order to install a relatively small photosensitive sheet material, the plate may be correspondingly reversed so as to receive members confining the area corresponding to the actual size of the photosensitive sheet material. However, such a frame requires additional plates in order to ensure an adequate light sealing of the upper surface. In other words, this frame itself does not provide the adequate light protection for the upper surface of the plate.

SUMMARY OF THE INVENTION

It is a general object of the present invention to avoid the disadvantages of the prior art frames for making photocopies.

More particularly, it is an object of the present invention to provide a frame for making photocopies, which frame renders it possible to freely select a section of a support plate to install a photosensitive sheet material thereon.

Another object of the present invention is to provide a frame for making photocopies which do not have any portions of white unexposed material.

Still another object of the present invention is to provide a frame for making photocopies, which can use a photosensitive sheet material of different sizes.

In pursuance of these objects and others which will become apparent hereafter, one feature of the present invention resides in a frame for making photocopies, which frame comprises a support plate which has an upper surface which is adapted to support photosensitive sheet material. The plate has four edges. At least two covers cover respective sections of the upper surface of the plate so as to prevent light penetration onto the latter. Each of said covers is adapted to pivot independently of the other between a first position in which a respective section of the upper surface of the plate is uncovered and a second position in which said respective section of the upper surface is covered. Means are provided on said covers, for sealingly engaging said edges of the plate when said covers are in said second position. Means are further provided, for sealingly connecting said covers to each other and permitting the pivotal movement of said covers independently of each other.

In accordance with another feature of the present invention, said connecting means constitute a lightproof hinge connection between two opposite flanges of said two covers.

Thus, if so necessary, a desired section of the upper surface of the plate may be exposed without exposing the remaining section of the upper surface of the plate.

In yet another feature of the present invention, the frame for making photocopies may be provided with two or more cover units. Each cover unit includes at least two covers connected by the above described connecting means. Two adjacent cover units contact each other along respective edge portions thereof. Each of said respective edge portions may be provided with a shoulder extending along the elongation of the respective edge portion. The shoulders of two adjacent cover units supplement each other so that, when the covers of two adjacent cover units are in said second position, the respective shoulders form together a groove open upwardly away from the plate.

A protective rod is freely received in said groove and etends along the entire elongation thereof. The rod may have a circular or polygonal cross-section. Accordingly, the groove is provided with a cross-section corresponding to that of the protective rod. Thus, when the covers of the cover units are in the second position, the rod located in the groove presses the respective flange portion of these covers against the upper surface of the support plate. Such an arrangement reliably prevents any access of the light to the upper surface of the plate. In response to lifting one of the covers (which is done in order to expose a respective section of the upper surface of the support plate), the protective rod will be lifted, by the respective edge portion of the lifted cover, from the groove. Thus, the entire section of the upper surface under the lifted cover becomes exposed. The protective rod is shifted automatically from its position in the groove and sidewardly. Such a movement of the protective rod can be limited, for example, by end projections located at both sides of the groove on the respective cover units or at the respective edge portions of the support plate. Since the side movement of the protective rod renders it possible to entirely uncover (i.e. expose) the section of the upper surface under question, any white portions on the photocopies (which may have occurred in the case of the prior art frames) are precluded. After the exposure of this section of the upper surface of the plate is over, the respective cover is moved back into the second position, and the protective rod rolls by itself back towards the grove and automatically takes its place in the latter.

Thus, the protective rod accomplishes two essential functions in a very simple manner. On the one hand, the protective rod, when in the groove, ensures a reliable light-sealing engagement between the upper surface of the support plate and the covers before or after at least one of the covers has been uncovered. On the other hand, the above-discussed sideward movement (shifting) of the protective rod makes it possible to expose the entire section of the upper surface so that the photocopies made on such a frame do not have any white (i.e. unexposed) portions.

Advantageously, the protective rod is operable without any additional handle in a simple and reliable manner.

In yet another feature of the present invention, said first means include grooves provided along the edge portions of an inner surface of the covers (i.e. the surface which faces the upper surface of the support plate when the covers are in said second position). The grooves on the inner surface of the covers are operative to light-sealingly embrace the respective edges of the support plate. Thus, when all the covers are in said second position thereof, the support plate is circumferentially embraced, at said four edges thereof, by respective grooves provided on the inner surface of the covers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of a frame according to the present invention;

FIG. 2 is a sectional view taken along the line II—II of the frame shown in FIG. 1 in a covered condition; and FIG. 3 is a sectional view taken along the line II—II of the frame shown in FIG. 1 in an uncovered condition.

DESCRIPTION OF PREFERRED EMBODIMENTS

Referring now to the drawings and first to the FIG. 1 thereof, it may be seen that the reference numeral 10 designates in toto a frame for making photocopies.

The frame 10 includes a rectangular support plate which is designated in toto by the reference numeral 14. The support plate 14 includes a circumferential vertical wall 12 having a circumferential horizontal rims 13 and bounding an upper surface 11 operative to support photosensitive sheet material (not shown).

The frame 10 further includes a rectangular cover which is designated in toto by the reference numeral 19. The cover 19 includes four cover elements 15. Each cover element 15 is adapted to cover a respective section 16 of the upper surface 11 of the plate 14.

Each two covers 15 are connected to one another by a hinge 17 which is light proof. In a preferred embodiment, the hinge 17 is a flexible strap 17' of synthetic plastic material. Thus, the flexible strap 17' connects two opposite flange portions of the two covers 15 so that the latter constitute together a cover unit 18. Three out of four flanges of the cover unit 18 overlap the respective horizontal rims 13 of the plate 14. In the embodiment shown in FIG. 1, the cover 19 includes two cover units 18 which extend parallel each other across the elongation of the plate 14. However, it should be understood, that in the case of comparatively longer frames 10, the cover 19 may include three or more cover units 18. On the other hand, should the frame 10 be rather small, then the cover 19 includes only one cover unit 18.

Two cover units 18 contact each other (e.g. along a middle line of the plate 14) at respective end faces of flange portions 15'. The flange portion 15' of the left (as seen in FIGS. 1-3) cover unit 18 is provided with a shoulder 20'. The flange portion 15' of the right (as seen in FIGS. 1-3) cover unit 18 is provided with a shoulder 20". The shoulders 20' and 20" supplement each other so that when the cover units 18 are in the closed position (see FIG. 2) the shoulders together form an upwardly open groove 20 which extends along entire width of the cover 19. An elongated rod 21 is freely located in the groove 20. The rod 21 has a circular cross-section and may be made of wood, synthetic plastic material, or any other material. The groove 20 has a cross-section corresponding to that of the rod 21. In a preferred embodiment the groove 20 has a circular cross-section. Each cover element 15 is provided adjacent the groove 20 with a projection 22 which are directed towards each other. The projections 22 are elastically yieldable in response to pressure of the rod 21 when the latter moves in direction of an arrow B and abuts one of these projections 22 (see FIG. 3). Instead of being arranged on the cover elements 15, the projections 22 may be provided on the vertical walls 12 of the plate 14. In order to eliminate displacement of the rod 21 in direction indicated by an arrow A (see FIG. 1), the rod is provided with enlarged portions 23. The displacement of the rod 21 in direction of the arrow A may be also precluded if the projections 22 are closed from both sides thereof and having respective holes.

Thus, when the rod 21 is in the groove 20, the rod presses, with its weight, the cover units 18 towards the upper surface 11 of the plate 14. It is essential to eliminate the displacement of the rod 21 along the arrow A, since otherwise the rod may slide completely out of the groove 20 which may result in unintentional and therefore uncontrollable uncovering of the upper surface 11 of the plate 14 by lifting of least one of the cover elements 15. Should the cover element 15 be unintentionally lifted from the plate 14, the upper surface 11 of the latter becomes exposed to the ambient light which might ruin the entire copying process should the ambient light be rather intense.

The plate 14 may be provided, for example, at a side wall 25 (see FIG. 2) with a holder 24 for holding the rod 21 when the latter is not used, for eample when it is necessary to expose the entire upper surface 11 of the plate 14 by uplifting the cover 19.

The holder 24 for the rod 21 may be also arranged on a conventional lifting member 26 which is operative for lifting the photosensitive sheet material from the upper surface 11 of the plate 14. The lifting member 26 is arranged on a side surface of the vertical wall 12. The lifting member 28 has a U-shaped configuration, and includes an upper arm constituting an actuating element 27 and a lifting arm 28. The lifting element is installed in a recess formed in the plate 14 so as to be located below a horizontal plane of the upper surface 11 of the plate 14. The lifting member 26 further includes a lower arm 26' which is operative to elastically hold the rod 21 when the latter is not in use. In other words, the lower arm 26' elastically abuts the rod 21 against an inner surface of the upper arm 27.

In order to ensure the light-proof installment of the lifting arm 28 of the lifting member 26 on the plate 14, the vertical wall 12 of the latter is provided with a hole 29 which receives a sealing member 30 (e.g. packing ring). The sealing member 30 may be made of synthetic plastic material, for example, rubber. The sealing member 30 is elastically yieldable in response to movement of the lifting arm 28. On the other hand, the sealing member 30 seals the hole 29 in the wall 12 against penetration of the light through this hole onto the upper surface 11 of the plate 14. FIGS. 1–3 show only one lifting member 26. However, it should be understood that there might be provided two and a larger number of the lifting members.

The sealing element 30 due to its elasticity functions as resilient means for returning the lifting arm 28 into its initial position shown in FIGS. 2 and 3, that is below the upper surface 11 of the plate 14.

In order to further increase the light protection of the upper surface of the plate 14, an inner surface 9 of the cover element 15 is provided with a groove 31 which is operative to embrace a respective portion of the rim 13 of the vertical wall 12 of the plate 14. Thus, when the cover 19 is in the closed position (see FIG. 2) the entire circumferential rim 13 of the plate 14 is embraced by the respective grooves 31 of the respective cover elements 15.

Before starting the exposure process, for example, of the section 16 of the upper surface 11 of the plate 14 (see FIG. 1), the photosensitive sheet material is positioned on the upper surface 11. The respective cover element 15 is then moved in to the closed position shown in FIG. 2. The rod 21 is then positioned in the groove 20 so as to prevent any light penetration onto the upper surface 11. To expose the section 16, the respective cover element 15 is lifted, so that the shoulder 20" slightly lifts the rod 21 from its position shown in FIG. 2. Should the above-mentioned respective cover element 15 be further lifted, the rod 21 will be shifted, along its entire length, laterally and outwardly from the groove 20 and in direction towards and into engagement with the respective projections 22. The projections 22 limit a further laterall movement of the rod 21 in direction away from the groove 20. Thus, the rod 21 is pressed by the shoulder 20" against the respective projection 22 and is held in such a position as illustrated in FIG. 3. The entire section 16 of the upper surface 11 is exposed, since the rod 21, when in the position illustrated in FIG. 3, does not prevent the respective cover element 15 from moving all the way upwardly so as to correspondingly expose the section 16 of the upper surface 11. However, any access of the light onto the remaining covered sections of the upper surface of the plate 14 is successfully prevented. This is true since the light proof position of the remaining cover elements 15 on the upper surface of the plate 14 is not at all affected by the fact that one cover element 15 is lifted so as to expose the respective section of the upper surface.

After the respective section 16 of the upper surface has been exposed, the respective cover element 15 is brought back into its closed (r.e. covered) position. In response to that, the rod 21 moves from the position illustrated in FIG. 3. into the position illustrated in FIG. 2, namely into the groove 20 between the cover units 18. Such a movement of the rod 21 is automatic and becomes possible since the shoulder 20", of the cover element 15 which is not lifted any longer, does not press the rod 21 against the respective projections 22, as discussed hereabove with reference to the position of the rod 21 shown in FIG. 3. When the cover elements 15 are in the closed position and the room light is on, and operator may make necessary adjustments or notes.

The above-described frame 10 may be used for a photosensitive sheet material of a size corresponding to that of the upper surface 11 of the plate 14, which may be, for example, 8×10" (or 20, 3×25.4 cm). Should it be necessary to operate with a photosensitive sheet material having any smaller overall sizes, for example, 18×24 em, the upper surface 11 of the plate 14 may be provided with removable elements 32 which may have different shapes, such as pins, angles, etc. The detachable elements 32 may be arranged on the upper surface 11 of the plate 14 so as to exactly correspond to the actual size of the photosensitive sheet material. In this case, the photosensitive sheet material of relatively smaller size is circumferentially surrounded (i.e. freed) by the detachable elements 32. The elements 32 may be operable for example from below the photosensitive sheet material. In order to prevent undesired slight lifting of the cover element 15 by the elements 32 (when the latter are arranged on the upper surface 11), the inner surface 9 of the cover element 15 is provided with respective recesses or grooves (not shown) for receiving the elements 32 in the vertical direction. The elements 32 may be interchangeable which renders it possible to adjust the elements 32 to the photosensitive sheet material having different sizes.

It should be understood that the above described frame 10 is only one of the possible embodiments of the present invention. Thus, for example, the rod 21 may have a polygonal cross-section instead of the above-mentioned circular cross-section. In any case, the rod 21 must be rollable, i.e. capable of being rolled in and out of the groove 20. The frame 10 may include not only one—or two—, but may have three or even more cover units 18. In this case, every two adjacent cover units 18 are provided between each other with the rod 21. The projections 22 may have any other shape and configuration different from that illustrated in FIGS. 1-3. It is possible for example to provide the projections 22, having a circular closed configuration, on the frame 14 rather than on the cover elements 15. In this case, the rod 15 is axially shifted in and out of these circular projections having respective openings. It is further possible to provide in the plane of the upper surface of the plate 14 a focusing plate. In this case, a picture can be precisely projected on this focusing plate by means of conventional magnifying devices (i.e. enlarges). Advantagiously, the manually operated element of the lifting member may be located at the display side of the focusing plate which is located in the plane of the paper. In order to adjust the focusing of the arrangement, the cover may remain closed. In this case, no focus loss takes place in view of the thickness of the cover. The above-discussed measures have the same inportance in the area between the cover units regardless of the use of one cover unit or one protective rod.

It will be understood that each of the elements described above, or two or more together, may also find a useful application in other types of a frame for making photocopies differing from the types described above.

While the invention has been illustrated and described as embodied in a frame for making photocopies, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A frame for making photocopies, comprising a support having an upper surface adapted to support photosensitive sheet material and having four edges; at least two adjacent cover units, each unit being formed with at least two adjacent covers for covering respective sections of said upper surface to prevent light penetration onto the latter, said covers being sealingly connected to each other by a hinge means to permit the pivotal movement of said covers independently of each other between open and closed positions within each of said cover units; means for sealingly engaging said edges of said support when said covers are in the closed position; said adjacent cover units having adjacent edges provided with shoulders shaped and dimensioned to complement each other and to form together an open groove when said covers are in the closed position; and means for pressing each two adjacent ones of said cover units in a direction towards said upper surface of said support, said pressing means including an elongated rod mountable in said groove and pressing said two adjacent cover units to thereby prevent light penetration onto said upper surface when the covers are in the closed position.

2. A frame as defined in claim 1, wherein said rod has a circular cross-section.

3. A frame as defined in claim 1, wherein said groove has a cross-section corresponding to that of said rod.

4. A frame as defined in claim 1, and further comprising means for limiting lateral movement of said rod caused by one of said shoulders in response to movement of at least one of said covers into said open position.

5. A frame as defined in claim 4, wherein said limiting means include projections provided on the covers of each of said two adjacent cover units and adjacent to said respective shoulders forming said groove.

6. A frame as defined in claim 5, wherein each of said covers is provided with at least one projection.

7. A frame as defined in claim 4, wherein said limiting means include projections provided on said support and adjacent to said respective shoulders on said covers, forming said groove.

8. A frame as defined in claim 1; and further including means for preventing movement of said rod in direction along the elongation thereof.

9. A frame as defined in claim 8, wherein said preventing means include enlarged formations provided at the ends of said rod.

10. A frame as defined in claim 1, and further comprising holding means on said support and operative for holding said rod when the latter is not in use.

11. A frame as defined in claim 10 wherein said holding means include a holder fixedly mounted on said support.

12. A frame as defined in claim 1, and further comprising removable means installable on said upper surface of the support and operative to fix on the latter the photosensitive sheet material.

13. A frame as defined in claim 12, wherein said removable means are adjustable so as to correspond to the actual size of the photosensitive sheet material.

* * * * *